Patented May 15, 1951

2,553,325

UNITED STATES PATENT OFFICE 2,553,325

ACCELERATION OF POLYMERIZATION OF POLYMERIZABLE MATERIALS

John A. Loritsch, Scotia, N. Y., assignor to General Electric Company, a corporation of New York No Drawing. Application July 23, 1946, Serial No. 685,774

3 Claims. (Cl. 260—78.5)

This invention relates to the polymerization of compounds containing polymerizable groupings. More particularly, this invention is concerned with a method of accelerating the rate of polymerization of a bulk polymerizable system, preferably a non-aqueous polymerizable system, containing an organic oxygen-releasing peroxide catalyst and a polymerizable compound capable of being polymerized by the aforementioned organic catalyst, e. g., a polymerizable compound containing a $CH_2=C<$ grouping, or a $—CH=CH—$ grouping, which method comprises incorporating in the said system a small amount of an organic reducing agent (also referred to herein as an "accelerator") selected from the class consisting of ascorbic acid (commonly known as vitamin C or l-ascorbic), isoascorbic acid (also known as d-ascorbic acid), and mixtures of the two, and thereafter effecting polymerization of the said system.

In the polymerization of chemical compounds or compositions containing polymerizable groupings or radicals of the type disclosed above (for brevity referred to hereinafter as "the polymerizable compounds"), it is often desired to accelerate the conversion of the monomeric material or, in some cases, a substantially unpolymerized material, to the polymeric form or substantially polymerized state. For this purpose, catalysts are incorporated in the polymerizable mixture. However, despite the use in some cases of quite active catalysts, for example, benzoyl peroxide, aluminum chloride, etc., it has often been difficult to effect the polymerization to obtain products having the desired properties and appearance.

For instance, when benzoyl peroxide is employed as a catalyst for the polymerization of a polymerizable system containing an unsaturated aliphatic alcohol ester of a polycarboxylic acid, for example, diallyl phthalate, and a polyhydric alcohol ester of an alpha unsaturated alpha, beta polycarboxylic acid (unsaturated alkyd resin), for example, diethylene glycol maleate, great care must be exercised in effecting the polymerization. If too large an amount of benzoyl peroxide is employed, the type of copolymer obtained will be inferior due to the low molecular weight of the product. If a small amount of benzoyl peroxide is employed, the time for effecting reaction is greatly extended. In addition, if the time for polymerization is attempted to be decreased by heating the polymerizable mass at higher temperatures, quite often the polymerized product contains bubbles, cracks, voids, etc.

I have now discovered that polymerizable systems of the kind mentioned in the first paragraph of this specification, more particularly such systems comprising polymerizable material containing a $CH_2=C<$ radical or a plurality of such radicals, or polymerizable material (other than, for example, drying and semi-drying oils and acids thereof) containing a $—CH=CH—$ radical, or a plurality of such radicals, may be polymerized at a much faster rate than has heretofore been possible to produce polymerized products having the appearance and properties comparable to products polymerized for much longer periods of time in accordance with the better techniques now employed in the art.

In accordance with the practice of the more specific embodiments of my invention, I am able to effect more rapid conversion of the above-described polymerizable compounds or compositions of matter to the finally polymerized state by incorporating in the polymerizable composition a small amount of an organic oxygen-releasing peroxide catalyst together with a small amount of an organic reducing compound selected from the class consisting of ascorbic acid, isoascorbic acid and mixtures of the two acids, which compounds or mixtures of compounds ordinarily act as inhibitors. My invention is to be differentiated from that disclosed and claimed in D'Alelio Patent 2,255,483 wherein polymerizable compositions of matter are polymerized in the presence of benzoyl peroxide and a compound selected from the class consisting of ascorbic acid, isoascorbic acid and mixtures of the acids. As will be apparent from the discussion that follows, under comparable conditions the effect produced by using an oxygen-releasing peroxide with, for example, ascorbic acid, is entirely different from the effect produced using benzoyl peroxide with the ascorbic acid. In the former case, the acceleration of polymerization is much greater than in the latter case.

In the practice of the present invention, the type of organic peroxide catalyst employed determines whether an acceleration of the polymerization will occur when the accelerator is incorporated in the polymerizable system. To understand this statement more fully, it is necessary to consider the manner in which various peroxides dissociate in the presence of a reducing agent, especially in the presence of a reducing agent of the type disclosed above, namely, ascorbic acid, isoascorbic acid or mixtures of the acids.

Benzoyl peroxide, for example, dissociates in the presence or absence of a reducing agent according to the following equation:

(1) 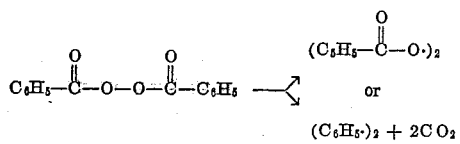

From this equation it will be apparent that there is no oxygen released as a result of the dissociation. The absence of oxygen in the dissociation (decomposition) of benzoyl peroxide is substantiated by the work of Hey and Walters as reported in Chem. Rev., 21, 169 (1937), and by McClure, Robertson and Cuthbertson as disclosed in Can. Jour. Res., 20B, 103 (1942).

When other organic peroxide compounds of the type employed in the practice of my invention are caused to dissociate, the reaction is believed to proceed as illustrated, for example, by the dissociation of tertiary butyl hydroperoxide:

(2) 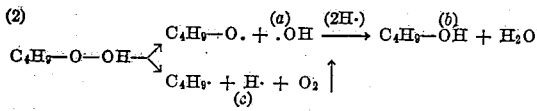

In the presence of the usual types of inhibitors, for example, hydroquinone, the dissociation proceeds according to (a) and (b) of the above equation. This reaction is shown by the following equation:

(3) 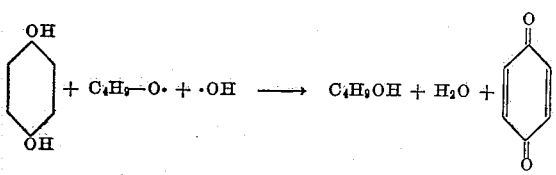

However, when, for example, tertiary butyl hydroperoxide is employed with the type of reducing agent used in the practice of my invention, the effect of this type of reducing agent, for example, ascorbic acid, the formula for which is

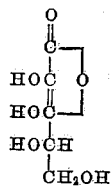

with tertiary butyl hydroperoxide, is to cause the dissociation of the ascorbic acid to proceed according to (c) of the above Equation 2; i. e., in the presence of the specific reducing agent (or accelerator), the oxygen given off by the organic oxygen-releasing peroxide catalyst attaches to the accelerator to form an oxidized derivative. For a more detailed description of the oxidation of ascorbic acid, reference may be had to Gilman's "Organic Chemistry, Advanced Treatise," vol. II, and Perkin and Kipping, "Organic Chemistry," Part III.

Although the mechanism whereby normally inhibiting compounds, e. g., ascorbic and isoascorbic acids, are converted to the form wherein they cause an acceleration of the polymerization, is not fully understood, it is believed that these compounds are oxidized by the acquisition of an atom of oxygen, and it is these oxidized compounds which promote the acceleration effect. In general, those reducing compounds which reduce by furnishing protons to another molecule do not promote acceleration but rather promote retardation of the polymerization. State alternatively, the acceleration effect is brought about by free radicals released by the reaction between a peroxide and its accelerators, the type of accelerator and peroxide used determining the effect produced.

My invention may be applied to the polymerization of various polymerizable monomers or compositions and mixtures of polymerizable monomers or compositions. These include, e. g., the various polymerizable monomers containing the $CH_2=C<$ grouping, for instance, styrene, substituted styrenes, e. g., dichlorostyrene, divinyl benzene, vinyl ethylbenzene, etc.; acrylic and methacrylic acids and derivatives thereof, including the nitriles of the said acids, e. g., acrylonitrile; the amides of the said acids, e. g., acrylamide, the esters of an acrylic acid of the general formula

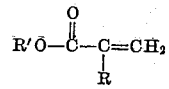

where R may be hydrogen and, in addition, may be a halogen or a hydrocarbon radical, more particularly, one selected from the class consisting of alkyl, aryl, alkaryl, and aralkyl radicals, and R' may be a substituted (e. g., halogenated (or an unsubstituted hydrocarbon radical which may be the same as R, for example, ethyl acrylate, butyl acrylate, methyl methacrylate, propyl methacrylate, propyl alphachloroacrylate, chlorobenzyl acrylate, tolyl acrylate, etc.; polyesters of an acrylic acid, e. g., ethylene diacrylate, etc.; allyl and methallyl ethers and esters of monocarboxylic and polycarboxylic saturated and unsaturated acids, e. g., vinyl allyl ether, diallyl phthalate, dimethallyl phthalate, diallyl tetrachlorophthalate, diallyl carbonate, allyl alloxyacetate, allyl acetate, diallyl succinate, etc.; vinyl ethers and esters, e. g., divinyl ether, vinyl esters of saturated and unsaturated monocarboxylic and polycarboxylic acids, e. g., vinyl acetate, vinyl propionate, vinyl butyrate, divinyl oxalate, etc.; other vinyl compounds, e. g., divinyl ketone, etc.; saturated and unsaturated monohydric and polyhydric alcohol esters of unsaturated polycarcarboxylic acids of the type exemplified by diethyl itaconate, diallyl itaconate, ethylene glycol itaconate, diethylene glycol itaconate, glyceryl itaconate, methyl citraconate, dimethallyl citraconate, diethyl mesaconate, diallyl mesaconate, etc.; vinyl halide compounds, e. g., vinyl chloride, vinyl bromide; etc.; diolefin compounds, e. g., butadiene-1,3, chloroprene, 2-cyanobutadiene-1,3, etc.

Among the compounds containing a

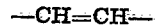

—CH=CH— grouping which may be polymerized in accordance with the concept of my invention are, e. g., saturated and unsaturated monohydric and polyhydric alcohol esters of alpha unsaturated alpha, beta polycarboxylic acids, for instance, diethyl fumarate, diethyl maleate, dibutyl fumarate, ethylene glycol maleate, ethylene glycol fumarate, diethylene glycol maleate, propylene glycol fumarate, glyceryl maleate, diallyl maleate, diallyl fumarate, dimethallyl maleate, etc. It will be understood by those skilled in the art that mixtures of compounds containing the $CH_2=C<$ grouping and the —CH=CH— grouping may also be employed as the polymerizable materials.

The amount of reducing agent, i. e., ascorbic acid, isoascorbic acid, or mixtures thereof, which may be employed may be varied depending on such factors as, e. g., the type of polymerizable materials employed, reaction products desired, temperature conditions, etc. Usually the amount, by weight, may be varied from about 0.001 to 10 per cent of the weight of the polymerizable materials. I prefer to employ from approximately 0.01 to 4 or 5 per cent, since no particular advantage accrues from using amounts in excess of these limits.

As was stated previously, not all organic peroxides are suitable for use in the practice of my invention. Only those organic peroxides which can be induced to give up an atom of oxygen in the presence of the organic reducing agent, many examples of which have been given above, may be used. These include, e. g., acetyl benzoyl peroxide, isopropyl teritiary butyl peroxide, tertiary butyl hydroperoxide, diheptanol peroxide, tertiary butyl perbenzoate, ditertiary butyl diperphthalate, tertiary butyl perfuroate, ditertiary butyl diperadipate, ditertiary butyl dipersuccinate, 1-hydroxy cyclohexyl hydroperoxide-1, tertiary amyl hydroperoxide, diacetyl peroxide, etc., as well as other aliphatic (e. g., alkyl), aromatic, or mixed aliphatic and aromatic (e. g., mixed alkylaryl) peroxides, peracids, hydroperoxides, peracid esters, etc. The amount of organic oxygen-releasing peroxide catalyst employed may also be varied over a wide range depending, for example, on the particular polymerizable materials employed, products desired, temperature conditions, etc. Usually I may employ from about 0.1 to 8 or 10 per cent, preferably from about 0.25 to 5 per cent, by weight, of the polymerizable materials.

In order that those skilled in the art may better understand how the present invention may be practiced, the following examples are given by way of illustration and not by way of limitation. All parts are by weight.

*Example 1*

In this example diallyl phthalate and diethylene glycol maleate were copolymerized in varying proportions using different organic peroxide catalysts and different organic reducing agents of the type disclosed and claimed in this invention. To determine the accelerating effect obtained by using the concept embraced by my invention, each polymerizable system was allowed to stand at room temperature until it was determined that the mixture had gelled. The time required to arrive at this gel stage was taken as the "Average time to gel at room temperature."

| Sample No. | Parts Diethylene Glycol Maleate | Parts Diallyl Phthalate | Catalyst | Accelerator | Average Time To Gel At Room Temperature |
|---|---|---|---|---|---|
| 1 | 33 | 67 | Tertiary butyl hydroperoxide, 1 part. | None | 340 Hours. |
| 2 | 33 | 67 | Same as 1 | Isoascorbic acid, 2 parts | 12 Hours. |
| 3 | 50 | 50 | Tertiary butyl perbenzoate, 3 parts. | None | 240 Hours. |
| 4 | 50 | 50 | Same as 3 | Ascorbic acid, 3 parts | Less than 3 minutes. |
| 5 | 33 | 67 | ___do___ | Ascorbic acid, 0.15 part; isoascorbic acid, 0.15 part (mixture of the two acids). | Less than 10 minutes. |

*Example 2*

This example illustrates the effect of using ascorbic and isoascorbic acids as accelerators for different polymerizable systems. The accelerating effect was determined by noting the time required to cause gelation of the polymerizable materials in the same manner as in Example 1.

| Sample No. | Polymerizable | Composition Parts | Catalyst | Accelerator | Average Time To Gel At Room Temperature |
|---|---|---|---|---|---|
| 5 | Glyceryl cyclohexyl maleate.[1] Styrene | 66.6 / 33.4 | Tertiary butyl perbenzoate, 3 parts. | None | 24 Hours. |
| 6 | Same as 5 | | Same as 5 | Ascorbic acid, 0.4 part | Less than 1 minute. |
| 7 | Castor oil "vinalkyd." Butylmethacrylate[2] | 27 / 73 | Tertiary butyl perbenzoate, 1.35 parts. | None | Greater than 66 hours. |
| 8 | Same as 7 | | Same as 7 | Ascorbic acid, 0.45 part | 2.5 Hours. |
| 9 | Methyl methacrylate | 100 | Same as 5 | None | 96 Hours. |
| 10 | Same as 9 | | ___do___ | Ascorbic acid, 3 parts | 5 Hours. |
| 11 | Methyl methacrylate | 100 | ___do___ | Isoascorbic acid, 3 parts | 7 Hours. |
| 12 | Same as 11 | 100 | ___do___ | Ascorbic acid, 0.75 part; isoascorbic acid, 0.75 part. | 5 Hours. |
| 13 | Vinyl acetate | 100 | ___do___ | None | Greater than 240 hours. |
| 14 | Same as 11 | | ___do___ | Same as 10 | 24 Hours. |

[1] This material was prepared by effecting reaction between 1 mol glycerine, 0.3 mol cyclohexyl alcohol, and 3 mols maleic anhydride.

[2] This material was prepared by effecting reaction, while heating, between 81 parts castor oil and 17.2 parts maleic anhydride. After cooking to an acid value of about 100-111, decarboxylation is effected by the addition of 1.8 parts pyridine and further heating (see Agens Patent U. S. 2,404,204).

It will be understood by those skilled in the art that the invention is not intended to be limited to the specific polymerizable materials or organic peroxide catalysts employed in the foregoing examples. Other polymerizable materials and organic peroxide catalysts as mentioned previously (supra) may also be employed in place of the ones used in the foregoing examples. It will be apparent, also, that the benefits derived at the temperatures employed in the foregoing examples are obtainable, though more pronounced, at higher temperatures, for example, at from about 80° to 150° C.

By means of my invention, it is possible to polymerize the aforementioned polymerizable materials in situ in shorter periods of time than has heretofore been possible, while at the same time the possibility of the development of voids, cracks, etc., in the polymerized piece is minimized. This is especially useful in casting and molding of such materials which are used, for example, as dielectrics for capacitors, as bushings, in potting and sealing applications, or for other electrical insulation purposes.

Advantage may also be taken of the accelerated rate of polymerization in other manufacturing procedures. For example, I may use the liquid form of the polymerizable materials containing one of the above-described oxygen-releasing peroxides and accelerators for coating compositions, or as cohesive ingredients in laminates. Since many of these polymerizable compositions are liquids and require no solvent, these compositions can be employed for coating or impregnating applications wherein it is possible to polymerize quite readily the entire impregnating or coating composition without the use of solvents.

In addition, because of the ability to gel the polymerizable compositions so readily by means of my claimed invention, it is now economically feasible to employ the gelled materials for molding compositions by grinding the gelled particles and molding the same under heat and pressure.

Even though solventless mixtures of the polymerizable materials may be employed for coating or other purposes specified previously, solution of the polymerizable mass in suitable solvents may also be effected to yield mixtures having decreased viscosities suitable, for example, for deposition on objects in thin films. Such solutions may be used for wire coatings and other typts of insulation including heat and electrical insulation, as acid- and alkali-resistant impregnants, etc.

It will, of course, be understood that the polymerizable compositions disclosed and claimed in this invention may be modified further by including fillers, opacifiers, pigments, etc.

What I claim as new and desire to secure by Letters Patent of the United States is:

1. The process for polymerizing in bulk a polymerizable system comprising diallyl phthalate and diethylene glycol maleate, which process comprises carrying out the polymerization in the presence of a mixture of ingredients consisting of (a) a vinyl polymerization catalyst selected from the class consisting of acetyl benzoyl peroxide, tertiary butyl hydroperoxide, diheptanol peroxide, tertiary butyl perbenzoate, ditertiary butyl diperphthalate, tertiary butyl perfuroate, ditertiary butyl diperadipate, ditertiary butyl dipersuccinate, 1-hydroxy cyclohexylhydroperoxide-1, tertiary amyl hydroperoxide, diacetyl peroxide, and (b) from 0.01 to 10 per cent, by weight, isoascorbic acid, based on the weight of the polymerizable ingredients, the rate of polymerization being substantially greater than the rate of polymerization when the isoascorbic acid is absent.

2. The process for accelerating the polymerization in bulk of a polymerizable system comprising diallyl phthalate and diethylene glycol maleate, which process comprises carrying out the polymerization in the presence of a mixture of ingredients consisting of (a) a vinyl polymerization catalyst consisting of tertiary butyl hydroperoxide, and (b) from 0.01 to 10 per cent, by weight, isoascorbic acid, based on the weight of the polymerizable ingredients, the rate of polymerization being substantially greater than the rate of polymerization when the isoascorbic acid is absent.

3. The process for accelerating the bulk polymerization of a polymerizable system comprising diallyl phthalate and diethylene glycol maleate, which process comprises carrying out the polymerization in the presence of a mixture of ingredients consisting of (a) a vinyl polymerization catalyst consisting of tertiary butyl perbenzoate, and (b) from 0.01 to 10 per cent, by weight, isoascorbic acid, based on the weight of the polymerizable ingredients, the rate of polymerization being substantially greater than the rate of polymerization when the isoascorbic acid is absent.

JOHN A. LORITSCH.

REFERENCES CITED

The following references are of record in the file of this patent:

UNITED STATES PATENTS

| Number | Name | Date |
|---|---|---|
| 2,380,474 | Stewart | July 31, 1945 |
| 2,409,633 | Kropa | Oct. 22, 1946 |
| 2,473,801 | Kropa | June 21, 1949 |